(12) United States Patent
Gady et al.

(10) Patent No.: US 8,061,126 B2
(45) Date of Patent: Nov. 22, 2011

(54) NITROGEN OXIDE ESTIMATION DOWNSTREAM OF A SELECTIVE CATALYTIC REDUCTION CATALYST

(75) Inventors: Kevin Andrew Gady, Ypsilanti, MI (US); Anupam Gangopadhyay, Chennai (IN)

(73) Assignee: GM Global Technology Operations LLC

( * ) Notice: Subject to any disclaimer, the term of this patent is extended or adjusted under 35 U.S.C. 154(b) by 448 days.

(21) Appl. No.: 12/417,962

(22) Filed: Apr. 3, 2009

(65) Prior Publication Data

US 2010/0024389 A1   Feb. 4, 2010

Related U.S. Application Data

(60) Provisional application No. 61/084,834, filed on Jul. 30, 2008.

(51) Int. Cl.
*F01N 3/20* (2006.01)
(52) U.S. Cl. ............................................ 60/286; 60/295
(58) Field of Classification Search .................... 60/286, 60/295, 301, 303
See application file for complete search history.

(56) References Cited

U.S. PATENT DOCUMENTS

| 6,981,368 | B2 | 1/2006 | van Nieuwstadt et al. |
| 7,736,595 | B2 | 6/2010 | Gady et al. |
| 2009/0185954 | A1* | 7/2009 | Qi et al. ........................ 422/62 |

OTHER PUBLICATIONS

U.S. Appl. No. 12/418,031, filed Apr. 3, 2009, Gady et al.

* cited by examiner

*Primary Examiner* — Thomas Denion
*Assistant Examiner* — Jonathan Matthias

(57) ABSTRACT

A dosing control system comprises a selective catalytic reduction (SCR) analysis module, a dosing management module, an adjustment module, and an error module. The SCR analysis module estimates ammonia (NH3) stored by an SCR catalyst, a maximum NH3 storage capacity of the SCR catalyst, and a nitrogen oxides (NOx) measurement for a NOx sensor downstream of the SCR catalyst. The dosing management module controls dosing agent injection upstream of the SCR catalyst based on the maximum NH3 storage capacity and the NH3 stored. The adjustment module outputs an adjusted estimate of the NOx measurement based on the estimate of the NOx measurement, cross-sensitivity of the NOx sensor, and a delay period for exhaust flow. The error module selectively adjusts at least one of the NH3 stored and the maximum NH3 storage capacity based on a difference between the adjusted estimate and NOx measured by the NOx sensor.

20 Claims, 5 Drawing Sheets

NITROGEN OXIDE ESTIMATION DOWNSTREAM OF A SELECTIVE CATALYTIC REDUCTION CATALYST

CROSS-REFERENCE TO RELATED APPLICATIONS

This application claims the benefit of U.S. Provisional Application No. 61/084,834, filed on Jul. 30, 2008.

This application is related to U.S. patent application Ser. Nos. 12/417,945 filed on Apr. 3, 2009 and 12/418,031 filed on Apr. 3, 2009. The disclosures of the above applications are incorporated herein by reference in their entirety.

FIELD

The present disclosure relates to engine systems and more particularly to exhaust treatment systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is presented. Air is drawn into an engine 102 through an intake manifold 104. A throttle valve 106 controls airflow into the engine 102. An electronic throttle controller (ETC) 108 controls the throttle valve 106 and, therefore, the airflow into the engine 102. The air mixes with fuel from one or more fuel injectors 110 to form an air/fuel mixture. The air/fuel mixture is combusted within one or more cylinders of the engine 102, such as cylinder 112. Combustion of the air/fuel mixture generates torque.

Exhaust resulting from the combustion of the air/fuel mixture is expelled from the cylinders to an exhaust system 113. The exhaust may include particulate matter (PM) and gas. The exhaust gas includes nitrogen oxides (NOx), such as nitrogen oxide (NO) and nitrogen dioxide ($NO_2$). The exhaust system 113 includes a treatment system 114 that reduces the respective amounts of NOx and PM in the exhaust.

The treatment system 114 includes a diesel oxidation catalyst (DOC) 116, a dosing agent injector 118, and a selective catalytic reduction (SCR) catalyst 120. The exhaust flows from the engine 102 to the DOC 116. The DOC 116 removes hydrocarbons and/or carbon oxides from the exhaust. The dosing agent injector 118 injects a dosing agent into the exhaust stream, upstream of the SCR catalyst 120. $NH_3$ provided by the dosing agent is absorbed by the SCR catalyst 120. $NH_3$ reacts with NOx in the exhaust passing the SCR catalyst 120.

An engine control module (ECM) 130 controls the torque output of the engine 102. The ECM 130 includes a dosing module 140 that controls the mass flow rate of dosing agent injected by the dosing agent injector 118. In this manner, the dosing module 140 controls $NH_3$ supplied to the SCR catalyst 120. Specifically, the dosing module 140 controls $NH_3$ supplied to the SCR catalyst 120 to control the amount of oxygen stored by the SCR catalyst 120.

The dosing module 140 controls the mass flowrate of dosing agent injected based upon signals from various sensors. For example only, the sensors include: one or more NOx sensors, such as NOx sensors 142 and 144; one or more temperature sensors, such as temperature sensors 146, 148, and 150; and/or one or more oxygen sensors, such as oxygen sensor 152.

The dosing module 140 may control $NH_3$ supplied to the SCR catalyst 120 further based on signals from other sensors 154. For example only, the other sensors 154 may include a manifold absolute pressure (MAP) sensor, a mass air flow (MAF) sensor, a throttle position sensor (TPS), an intake air temperature (IAT) sensor, and/or other suitable sensor(s).

The amount of $NH_3$ stored by the SCR catalyst 120 is referred to as current storage (mols). The percentage of NOx that is removed from the exhaust is referred to as the conversion efficiency or the NOx conversion rate. The NOx conversion rate is directly related to the current storage of the SCR catalyst 120. For example, the NOx conversion rate increases as the current storage of the SCR catalyst 120 increases. The dosing module 140 controls $NH_3$ supplied in a manner that maximizes the NOx conversion rate.

SUMMARY

A dosing control system comprises a selective catalytic reduction (SCR) analysis module, a dosing management module, an adjustment module, and an error module. The SCR analysis module estimates ammonia (NH3) stored by an SCR catalyst, a maximum NH3 storage capacity of the SCR catalyst, and a nitrogen oxides (NOx) measurement for a first NOx sensor located downstream of the SCR catalyst. The dosing management module controls dosing agent injection into an exhaust system upstream of the SCR catalyst based on the maximum NH3 storage capacity and the NH3 stored. The adjustment module outputs an adjusted estimate of the NOx measurement based on the estimate of the NOx measurement, cross-sensitivity of the first NOx sensor, and a delay period for exhaust flow between a second NOx sensor located upstream of the SCR catalyst and the first NOx sensor. The error module selectively adjusts at least one of the NH3 stored and the maximum NH3 storage capacity based on a difference between the adjusted estimate and NOx measured by the first NOx sensor.

In other features, the adjustment module outputs the adjusted estimate further based on a response period of the first NOx sensor.

In still other features, the cross sensitivity of the first NOx sensor includes a first sensitivity to nitrogen dioxide (NO2) and a second sensitivity to NH3.

In further features, the SCR analysis module estimates NH3 slip downstream of the SCR catalyst. The adjustment module outputs the adjusted estimate based on a sum of a first product of the estimate of the NOx measurement and a NO2 gain corresponding to the first sensitivity and a second product of the NH3 slip and a NH3 gain corresponding to the second sensitivity.

In still further features, the adjustment module determines the NO2 gain based a ratio of NO2 to NOx.

In other features, the adjustment module determines the NH3 gain based on the estimate of the NOx measurement.

In still other features, the SCR analysis module estimates NH3 desorption and adjusts the NH3 slip based on the NH3 desorption.

In further features, the adjustment module outputs the adjusted estimate after the delay period.

In still further features, the adjustment module estimates the delay period based on a distance between the first and second NOx sensors and an exhaust velocity.

In other features, the SCR analysis module estimates NH3 oxidation and estimates the NH3 stored based on the NH3 oxidation.

A dosing method comprises: estimating ammonia (NH3) stored by an SCR catalyst, a maximum NH3 storage capacity of the SCR catalyst, and a nitrogen oxides (NOx) measurement for a first NOx sensor located downstream of the SCR catalyst; controlling dosing agent injection into an exhaust system upstream of the SCR catalyst based on the maximum NH3 storage capacity and the NH3 stored; outputting an adjusted estimate of the NOx measurement based on the estimate of the NOx measurement, cross-sensitivity of the first NOx sensor, and a delay period for exhaust flow between a second NOx sensor located upstream of the SCR catalyst and the first NOx sensor; and selectively adjusting at least one of the NH3 stored and the maximum NH3 storage capacity based on a difference between the adjusted estimate and NOx measured by the first NOx sensor.

In other features, the outputting comprises outputting the adjusted estimate further based on a response period of the first NOx sensor.

In still other features, the cross sensitivity of the first NOx sensor includes a first sensitivity to nitrogen dioxide (NO2) and a second sensitivity to NH3.

In further features, the dosing method further comprises estimating NH3 slip downstream of the SCR catalyst. The outputting comprises outputting the adjusted estimate based on a sum of a first product of the estimate of the NOx measurement and a NO2 gain corresponding to the first sensitivity and a second product of the NH3 slip and a NH3 gain corresponding to the second sensitivity.

In still further features, the dosing method further comprises determining the NO2 gain based a ratio of NO2 to NOx.

In other features, the dosing method further comprises determining the NH3 gain based on the estimate of the NOx measurement.

In still other features, the dosing method further comprises estimating NH3 desorption and adjusting the NH3 slip based on the NH3 desorption.

In further features, the dosing method further comprises determining the adjusted estimate and delaying for the delay period, wherein the outputting comprises outputting the adjusted estimate after the delay period.

In still further features, the dosing method further comprises estimating the delay period based on a distance between the first and second NOx sensors and an exhaust velocity.

In other features, the dosing method further comprises estimating NH3 oxidation. The estimating the NH3 stored comprises estimating the NH3 stored based on the NH3 oxidation.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
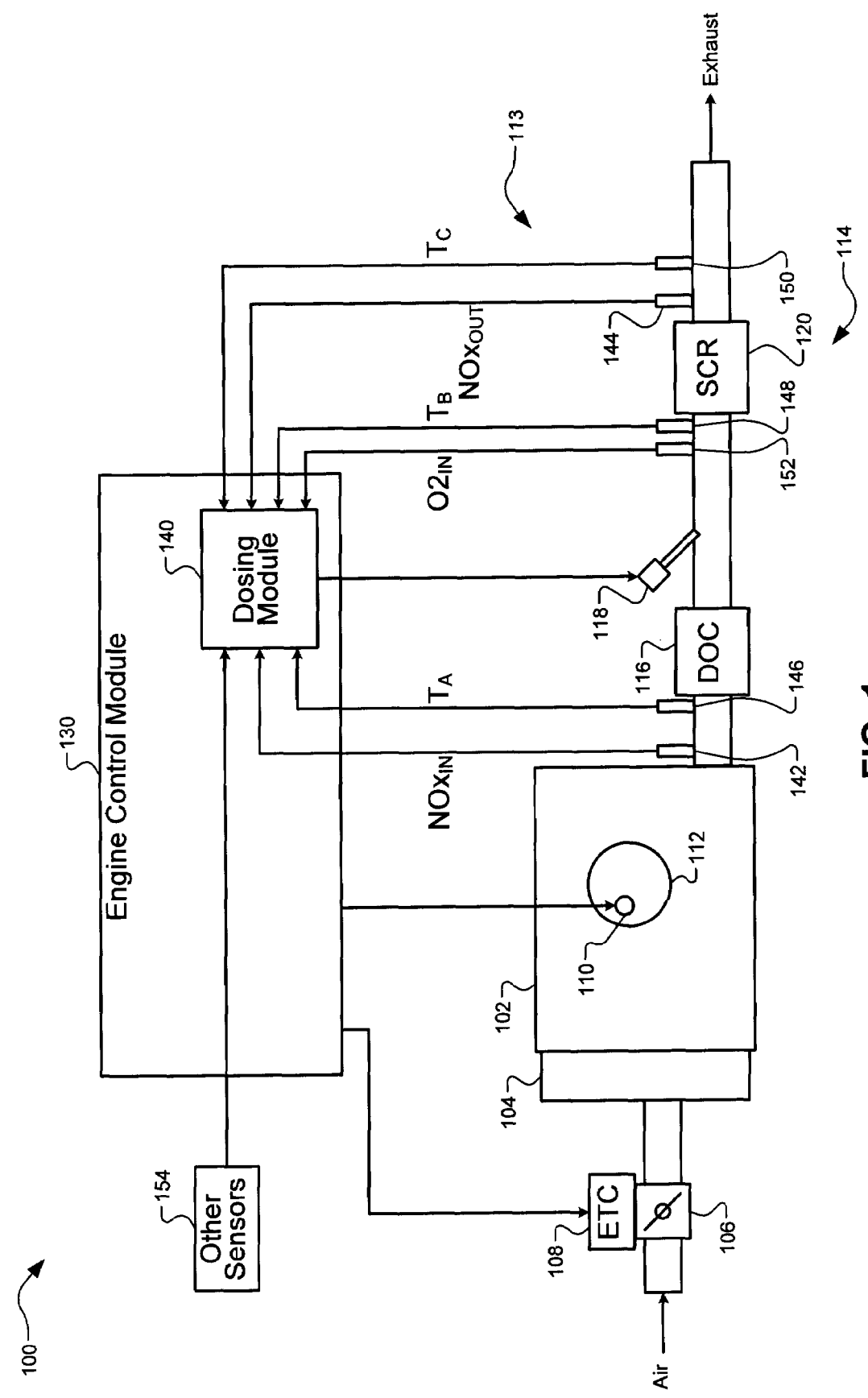
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A dosing control system according to the present disclosure estimates a nitrogen oxides (NOx) measurement for a NOx sensor that is located downstream of a selective catalytic reduction (SCR) catalyst. The NOx sensor, however, is cross-sensitive to ammonia (NH3). Accordingly, the NOx measured by the NOx sensor may include $NH_3$ present in the exhaust.

The dosing control system of the present disclosure adjusts the estimated NOx measurement based on the cross sensitivity of the NOx sensor. The dosing control system also determines a delay period corresponding to the period for the exhaust to flow to the NOx sensor. The dosing control system delays use of the adjusted NOx estimate until the delay period passes.

The dosing control system compares the adjusted NOx estimate with the NOx measured by the NOx sensor. Based on the comparison, the dosing control system may, for example, adjust various parameters used in controlling the injection of dosing agent, diagnose aging of the SCR catalyst, and/or diagnose poisoning of the SCR catalyst.

Figure 2:
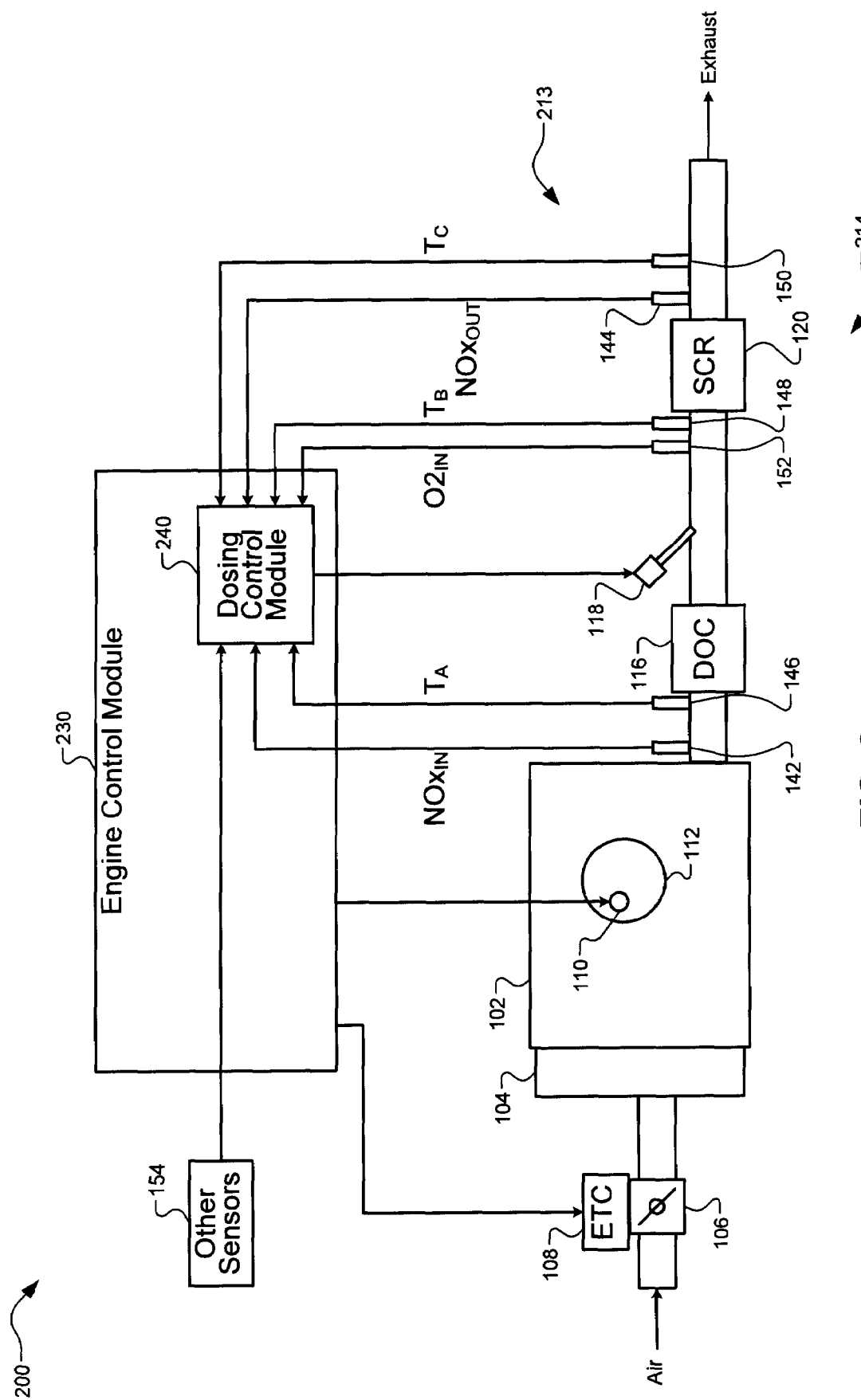
FIG. 2 is a functional block diagram of an exemplary engine system according to the principles of the present disclosure.

Referring now to FIG. 2, a functional block diagram of an exemplary engine system 200 is presented. The engine 102 may be, for example, a gasoline-type internal combustion engine, a diesel-type internal combustion engine, a hybrid-type engine, and/or another type of engine. The engine 102 generates torque by combusting an air/fuel mixture within cylinders of the engine 102. The engine 102 may include a plurality of cylinders, such as the cylinder 112. For example only, the engine 102 may include 2, 3, 4, 5, 6, 8, 10, or 12 cylinders. Combustion of the air/fuel mixture produces exhaust.

Exhaust produced through combustion of the air/fuel mixture is expelled from the cylinders to an exhaust system 213. The exhaust system 213 includes a treatment system 214 that reduces particulate matter (PM) and nitrogen oxides (NOx) in the exhaust. The treatment system 214 includes the diesel oxidation catalyst (DOC) 116, the dosing agent injector 118, and the SCR catalyst 1 20.

The dosing agent injector 118 injects a dosing agent into the exhaust stream, upstream of the SCR catalyst 120. The dosing agent may be urea ($CO(NH_2)_2$), ammonia ($NH_3$), and/or another suitable dosing agent. In implementations where urea is injected, the urea reacts with the exhaust and results in $NH_3$. The dosing agent may in some instances be diluted with, for example, water ($H_2O$). In such implementations, heat from the exhaust gas evaporates the water, again resulting in $NH_3$. An exemplary chemical equation that is illustrative of the production of $NH_3$ from a dosing agent solution is provided below.

$$HCNO + H_2O \rightarrow NH_3 + CO_2 \quad (1)$$

The SCR catalyst 120 stores (i.e., absorbs) $NH_3$ supplied by the dosing agent. The SCR catalyst 120 may be any suitable type of SCR catalyst. For example only, the SCR catalyst 120 may include a vanadium catalyst and/or a zeolite catalyst. The SCR catalyst 120 may be implemented with a diesel particulate filter (DPF) or in another suitable configuration. An exemplary chemical equation that is illustrative of $NH_3$ absorption is provided below.

$$NH_3 + S \rightarrow NH_3(S) \quad (2)$$

The SCR catalyst 120 catalyzes a reaction between the stored $NH_3$ and NOx passing the SCR catalyst 120. The amount of $NH_3$ stored by the SCR catalyst 120 is referred to as current storage (mols). NOx and $NH_3$ react at a known rate, which is referred to as $k_{3OX}$. The reaction rate $k_{3OX}$ is described by the equation:

$$k_{3OX} = \frac{X \text{ mol } NH_3}{1 \text{ mol } NO_X}, \quad (3)$$

where X varies depending on the amount of $NO_2$ in the exhaust. For example only, X varies between from 1.0 and 1.333.

The percentage of NOx that is removed from the exhaust via the NOx and $NH_3$ reaction is referred to as conversion efficiency or NOx conversion rate. The NOx conversion rate is directly related to the current storage of the SCR catalyst 120. For example only, the NOx conversion rate increases as the current storage increases.

The current storage of the SCR catalyst 120, however, is limited to a maximum amount of $NH_3$ (mols). This maximum amount of $NH_3$ is referred to as the maximum storage capacity of the SCR catalyst 120. Maintaining the current storage of the SCR catalyst 120 at the maximum storage capacity ensures that a maximum amount of NOx is removed from the exhaust. In other words, maintaining the current storage at the maximum storage capacity ensures that a maximum NOx conversion rate is achieved.

Maintaining the current storage at or near the maximum storage capacity also increases the possibility that $NH_3$ will be exhausted from the treatment system 214. This increased possibility may be attributable to the inverse relationship between the maximum storage capacity and the temperature of the SCR catalyst 120. For example, the maximum storage capacity decreases as the SCR temperature increases. A condition referred to as $NH_3$ slip occurs when $NH_3$ is exhausted from the exhaust system 213.

$NH_3$ desorbs (i.e., releases) from the SCR catalyst 120 when the SCR temperature increases at times when the current storage is equal to the maximum storage capacity. In other words, an increase in the SCR temperature causes a decrease in maximum storage capacity, and $NH_3$ stored in excess of this decreased maximum storage capacity is desorbed. Thus, an increase in the SCR temperature may cause $NH_3$ slip. An exemplary chemical equation that is illustrative of $NH_3$ desorption is provided below.

$$NH_3(S) \rightarrow NH_3 + S \quad (4)$$

All or a portion of $NH_3$ supplied by the dosing agent may oxidize before or after being absorbed by the SCR catalyst 120. For example, $NH_3$ may react with oxygen in the exhaust to produce nitrogen ($N_2$) and water ($H_2O$). $NH_3$ oxidation may be triggered by, for example, heat provided by the exhaust. An exemplary chemical equation that is illustrative of $NH_3$ oxidation is provided below.

$$4NH_3 + 3O_2 \rightarrow 2N_2 + 6H_2O \quad (5)$$

The $NH_3$ and NOx reaction produces nitrogen and water. Other components of the exhaust, such as oxygen ($O_2$), may also be involved in the $NH_3$ and NOx reaction. The exemplary chemical equations provided below are illustrative of the $NH_3$ and NOx reaction.

$$4NH_3 + 4NO + O_2 \rightarrow 4N_2 + 6H_2O \quad (6)$$

$$4NH_3 + 2NO + 2NO_2 \rightarrow 4N_2 + 6H_2O \quad (7)$$

$$8NH_3 + 6NO_2 \rightarrow 7N_2 + 12H_2O \quad (8)$$

The treatment system 214 includes the NOx sensors 142 and 144 and the temperature sensors 146, 148, and 150. The treatment system 214 also includes the oxygen sensor 152. The NOx sensor 142 is located upstream of the DOC 116, and the NOx sensor 144 is located downstream of the SCR catalyst 120. In other implementations, the NOx sensor 142 is located between the DOC 116 and the SCR catalyst 120.

The NOx sensors 142 and 144 measure NOx upstream and downstream of the SCR catalyst 120, respectively. In other words, the NOx sensors 142 and 144 measure NOx flowing in to and out of the SCR catalyst 120. The NOx sensors 142 and 144 generate signals corresponding to the concentration of NOx (ppm) at their respective locations, which are referred to as $NOx_{IN}$ and $NOx_{OUT}$, respectively.

The temperature sensors 146, 148, and 150 are located in various places throughout the exhaust system 213. For example only, as shown in FIG. 2, the temperature sensor 148 is located downstream of the DOC 116 and upstream of the SCR catalyst 120, and the temperature sensor 150 is located downstream of the SCR catalyst 120. The temperature sensor 146 is located upstream of the DOC 116. The temperature sensors 146, 148, and 150 each measure temperature of the exhaust at their respective locations and output a signal that corresponds to that measured temperature. The signals output by the temperature sensors 146, 148, and 150 are referred to as $T_A$, $T_B$, and $T_C$, respectively.

An engine control module (ECM) 230 controls the torque output of the engine 102. The ECM 230 includes a dosing control module 240 that controls the mass flow rate of dosing agent injected by the dosing agent injector 118. In this manner, the dosing control module 240 controls $NH_3$ supplied to the SCR catalyst 120. The mass flow rate of dosing agent supplied is referred to as $DA_{IN}$ (g/s), and the rate at which $NH_3$ is supplied to the SCR catalyst 120 is referred to as the $NH_3$ supply rate.

The dosing control module 240 controls the $DA_{IN}$ to maximize the NOx conversion rate and minimize $NH_3$ slip. The dosing control module 240 estimates the current storage of the SCR catalyst 120 based on the amount of $NH_3$ supplied to the SCR catalyst 120, $NH_3$ converted via reaction with NOx, $NH_3$ desorbed, $NH_3$ oxidized, and/or other parameter(s).

The dosing control module 240 also estimates the downstream concentration of NOx that will be measured by the NOx sensor 144 (i.e., $NOx_{OutPred}$). The dosing control module 240 uses this estimation of the downstream NOx with feedback from the NOx sensor 144. The NOx sensor 144, however, is cross sensitive to $NH_3$. Thus, the $NOx_{OUT}$ includes measured NOx downstream of the SCR catalyst 120 and measured $NH_3$ downstream of the SCR catalyst 120.

The dosing control module 240 adjusts the $NOx_{OutPred}$ to account for the cross sensitivity of the NOx sensor 144. Additionally, the dosing control module 240 adjusts the $NOx_{OutPred}$ to account for the characteristics of the NOx sensor 144, such as the time constant of the NOx sensor 144. The $NOx_{OutPred}$ that is adjusted for the cross sensitivity of the NOx sensor 144 and the characteristics of the NOx sensor 144 is referred to as $NOx_{OutADJ}$.

The dosing control module 240 also delays the $NOx_{OutADJ}$ based on the time necessary for the exhaust to travel through the treatment system 214 to the location of the NOx sensor 144. This period of time is referred to as the transport delay (seconds). The dosing control module 240 stores the $NOx_{OutADJ}$ and delays use of the $NOx_{OutADJ}$ until the period of time corresponding to the transport delay has passed. In this manner, the dosing control module 240 refrains from using the $NOx_{OutADJ}$ with feedback from the NOx sensor 144 until the NOx sensor 144 produces the corresponding $NOx_{OUT}$ signal.

The dosing control module 240 determines an error term (i.e., $NOx_{ERR}$) based on the difference between the $NOx_{OutADJ}$ and $NOx_{OUT}$. The dosing control module 240 also determines possible sources of the $NOx_{ERR}$. For example only, the dosing control module 240 determines whether the $NOx_{ERR}$ is attributable to poisoning of the SCR catalyst 120, aging of the SCR catalyst 120, and/or inaccuracy in determining the current storage of the SCR catalyst 120. Other possible sources of the $NOx_{ERR}$ include, for example, inaccuracy in the adjustment of the $NOx_{OutPred}$, inaccuracy in determining $NH_3$ slip, and/or another source.

The dosing control module 240 selectively adjusts data, such as the current storage. The dosing control module 240 determines whether to adjust the current storage based on, for example, the $NOx_{ERR}$. If the dosing control module 240 determines to adjust the current storage, the dosing control module 240 determines whether the adjustment should be an increase or decrease and the magnitude of the adjustment. In this manner, the dosing control module 240 adjusts the current storage for future control of $NH_3$ supplied to the SCR catalyst 120 and/or the estimation of the NOx output. While the dosing control module 240 is shown as being located within the ECM 230, the dosing control module 240 may be located in other locations, such as external to the ECM 230.

Figure 3:
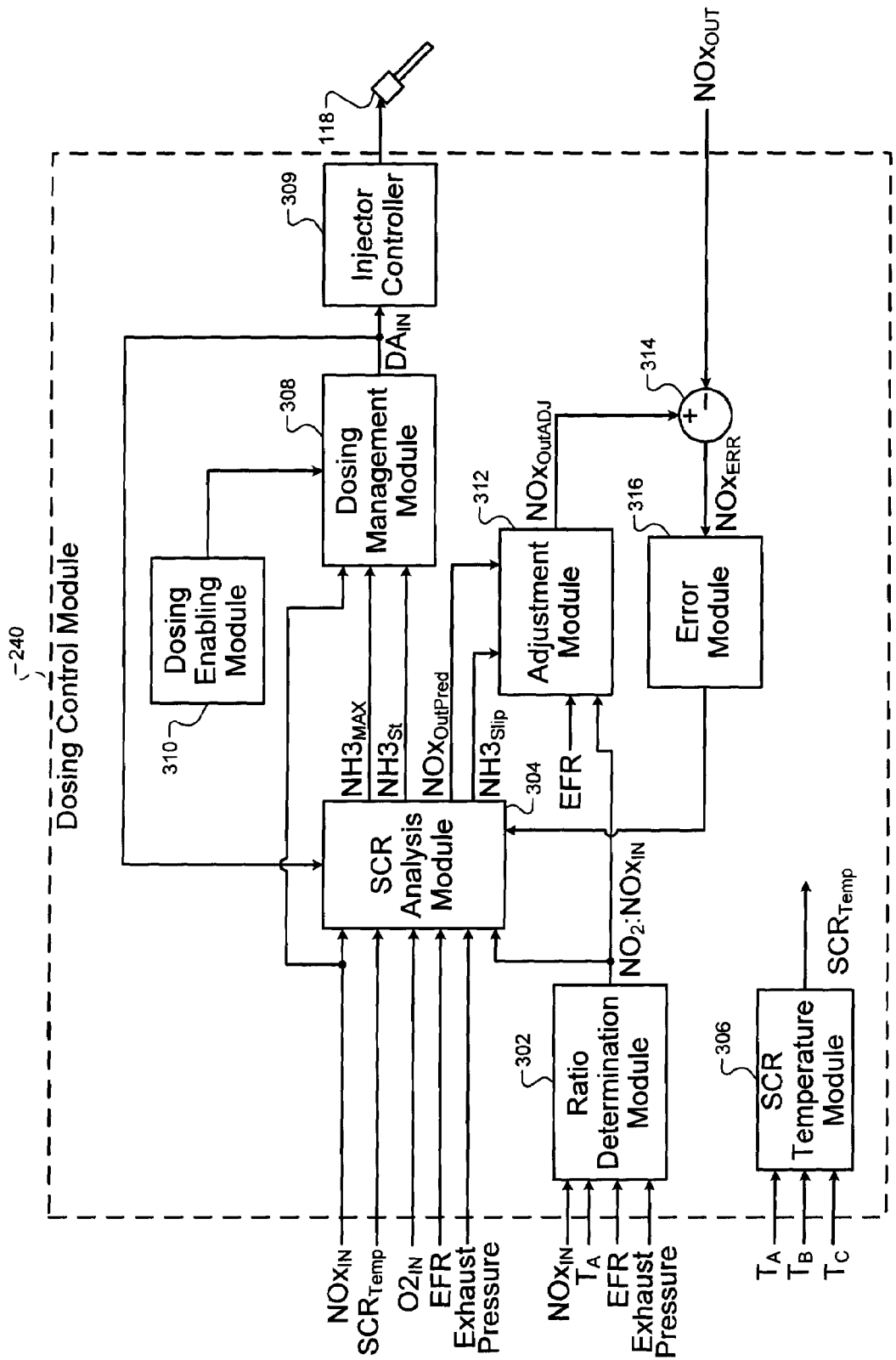
FIG. 3 is a functional block diagram of an exemplary dosing control module according to the principles of the present disclosure.

Referring now to FIG. 3, a functional block diagram of an exemplary implementation of the dosing control module 240 is presented. The dosing control module 240 includes a ratio determination module 302, an SCR analysis module 304, an SCR temperature module 306, a dosing management module 308, and a dosing enabling module 310. The dosing control module 240 also includes an adjustment module 312, a difference module 314, and an error module 316.

The ratio determination module 302 estimates the ratio of $NO_2$ in the NOx flowing into the SCR catalyst 120 and generates a $NO_2:NOx_{IN}$ signal accordingly. The ratio of $NO_2$ in the NOx flowing into the SCR catalyst 120 is referred to as the $NO_2$ ratio.

The ratio determination module 302 determines the $NO_2$ ratio based on the exhaust conditions and the $NOx_{IN}$. The exhaust conditions include, for example, exhaust pressure, exhaust temperature, exhaust flow rate (EFR), the air/fuel mixture, and/or other parameter(s). The exhaust pressure may be measured, for example, upstream of the DOC 116. The ratio determination module 302 may use any suitable measure of the exhaust temperature, such as the $T_A$. The EFR may be measured in any suitable manner, such as using a sensor (not shown). In other implementations, the EFR may be determined based on the MAF into the engine 102.

The SCR analysis module 304 estimates various parameters related to control of $NH_3$ supplied to the SCR catalyst 120. For example only, the SCR analysis module 304 determines feed-forward parameters, such as the maximum storage capacity of the SCR catalyst 120 (i.e., $NH3_{Max}$) and the current storage of the SCR catalyst 120 (i.e., $NH3_{St}$). The SCR analysis module 304 also estimates various feed-back related parameters, such as the NOx downstream of the SCR catalyst 120 (i.e., $NOx_{OutPred}$) and $NH_3$ downstream of the SCR catalyst 120 (i.e., $NH3_{Slip}$).

The SCR analysis module 304 determines the maximum storage capacity of the SCR catalyst 120 based on the SCR temperature. For example, as the SCR temperature increases, the maximum storage capacity decreases. The SCR analysis module 304 may also determine the maximum storage capacity based on other parameters, such as the EFR.

The SCR temperature module 306 determines the SCR temperature based on the temperatures $T_A$, $T_B$, and/or $T_C$. The SCR temperature may also be determined based on the configuration of the SCR catalyst 120. For example, in some implementations, the SCR catalyst 120 is divided into sections. A buffer may be included with the SCR catalyst 120, such as between the sections and/or after the SCR catalyst 120. The SCR temperature module 306 may determine a temperature for each of the sections or a temperature profile for the temperature at various locations throughout the SCR catalyst 120.

The SCR analysis module 304 also estimates the current storage of the SCR catalyst 120 and generates the $NH3_{St}$ signal accordingly. The current storage corresponds to the amount of $NH_3$ (mols) stored by the SCR catalyst 120. The SCR analysis module 304 may selectively set the current storage to a known value.

The SCR analysis module 304 thereafter determines a change in the current storage and adjusts the current storage accordingly. The SCR analysis module 304 determines the change in current storage based on $NH_3$ supplied to the SCR catalyst, $NH_3$ oxidized, $NH_3$ slip, $NH_3$ converted via reaction with NOx, and/or various other parameters. These parameters may include, for example, the SCR temperature, oxygen flowing into the SCR catalyst 120, the exhaust pressure, the space velocity of the SCR catalyst 120, and/or the EFR.

The dosing management module 308 controls $NH_3$ supplied to the SCR catalyst 120 by controlling the mass flow rate of dosing agent injected (i.e., $DA_{IN}$)(g/s). The dosing management module 308 controls the $DA_{IN}$ based on the maximum storage capacity of the SCR catalyst 120, the current storage of the SCR catalyst 120, and the $NOx_{IN}$. The dosing management module 308 may also control the $DA_{IN}$ based on the $NO_2$ ratio. More specifically, the dosing management module 308 determines a set point for the current storage that will produce a maximum NOx conversion rate and minimize the potential for $NH_3$ slip. The dosing management module 308 controls $DA_{IN}$ based on the set point.

An injector controller or driver 309, receives $DA_{IN}$ and applies a signal to the dosing agent injector 118 based on the $DA_{IN}$. The signal applied to the dosing agent injector 118 may be any suitable type of signal. For example only, a PWM signal may be applied at a duty cycle (i.e., percentage of time ON during a predetermined period of time) that corresponds to the $DA_{IN}$. By controlling the $DA_{IN}$, the dosing management module 308 controls the supply of $NH_3$ to the SCR catalyst 120.

The dosing enabling module 310 selectively enables the dosing management module 308. Otherwise, the dosing management module 308 and, therefore, $NH_3$ supplied to the SCR catalyst 120, is disabled. For example only, the dosing enabling module 310 enables the dosing management module 308 when the exhaust temperature is greater than a predetermined temperature. When the exhaust temperature is less than this temperature, the dosing agent may be unable to convert into $NH_3$. Additionally, $NH_3$ stored by the SCR catalyst 120 may be unable to react with NOx when the exhaust temperature is less than the predetermined temperature.

The SCR analysis module 304 estimates the NOx that will be measured by the NOx sensor 144 and generates a $NOx_{OutPred}$ signal accordingly. The SCR analysis module 304 estimates the $NOx_{OutPred}$ based on the space velocity of the SCR catalyst 120 and the SCR temperature. The $NOx_{OutPred}$ may also be estimated based on the current storage of the SCR catalyst 120, the $NO_2$ ratio, and/or other parameter(s). The $NOx_{OutPred}$, however, does not account for the cross sensitivity of the NOx sensor 144. Additionally, the $NOx_{OutPred}$ does not account for the transport delay or the characteristics of the NOx sensor 144.

The SCR analysis module 304 estimates the $NH_3$ slip that will occur when the exhaust reaches the NOx sensor 144 and generates an $NH3_{Slip}$ signal accordingly. The estimated $NH_3$ slip will be used in adjusting the $NOx_{OutPred}$ for the cross sensitivity of the NOx sensor 144. The $NH_3$ slip may include $NH_3$ desorbed from the SCR catalyst 120, $NH_3$ that traverses the SCR catalyst 120 without being absorbed, and/or other sources of $NH_3$ downstream of the SCR catalyst 120. The SCR analysis module 304 estimates the $NH_3$ slip based on the space velocity of the SCR catalyst 120, the SCR temperature, the current storage of the SCR catalyst 120, the maximum storage capacity of the SCR catalyst 120, and/or other parameter(s).

The adjustment module 312 according to the principles of the present disclosure adjusts the $NOx_{OutPred}$ based on the cross sensitivity of the NOx sensor 144. In this manner, the adjustment module 312 provides a more accurate estimate of the NOx downstream of the SCR catalyst 120. This estimate is compared with the $NOx_{OUT}$ from the NOx sensor 144 in determining $NOx_{ERR}$.

The adjustment module 312 also adjusts the $NOx_{OutPred}$ based on the characteristics of the NOx sensor 144, such as the response time (i.e., the time constant) of the NOx sensor 144. The $NOx_{OutPred}$ adjusted for the cross sensitivity of the NOx sensor 144 and the characteristics of the NOx sensor 144 is referred to as the $NOx_{OutADJ}$. The adjustment module 312 delays the output of the $NOx_{OutADJ}$ based on the transport delay. In this manner, the adjustment module 312 outputs the $NOx_{OutADJ}$ at a time corresponding to when the NOx sensor 144 will output the corresponding $NOx_{OUT}$.

The difference module 314 receives the $NOx_{OUT}$ from the NOx sensor 144 and the $NOx_{OutADJ}$ from the adjustment module 312. The difference module 314 determines a NOx error term and generates a $NOx_{ERR}$ signal accordingly. The difference module 314 determines the NOx error term based on the difference between the $NOx_{OutADJ}$ and the $NOx_{OUT}$. For example only, the NOx error term may be determined as the $NOx_{OutADJ}$ less the $NOx_{OUT}$.

The error module 316 determines whether one or more parameters should be adjusted based on the $NOx_{ERR}$. The error module 316 may determine whether, for example, the current storage of the SCR catalyst 120 should be adjusted. For example only, the error module 316 may determine that the current storage should be adjusted when the $NOx_{ERR}$ is greater than a predetermined value.

The error module 316 determines the direction of the adjustment (e.g., increase or decrease) and the magnitude of the adjustment and adjusts the current storage accordingly. For example only, when the current storage is less than the maximum storage capacity, the $NH3_{Slip}$ is small or zero, and the $NOx_{ERR}$ is large, the error module 316 may increase the current storage. The large $NOx_{ERR}$ under these conditions may be attributable to the NOx sensor 144 measuring $NH_3$ slip, which occurs when the current storage is at the maximum storage capacity. For example only, the error module 316 may adjust the current storage based on the maximum storage capacity or the $NOx_{ERR}$.

Figure 4:
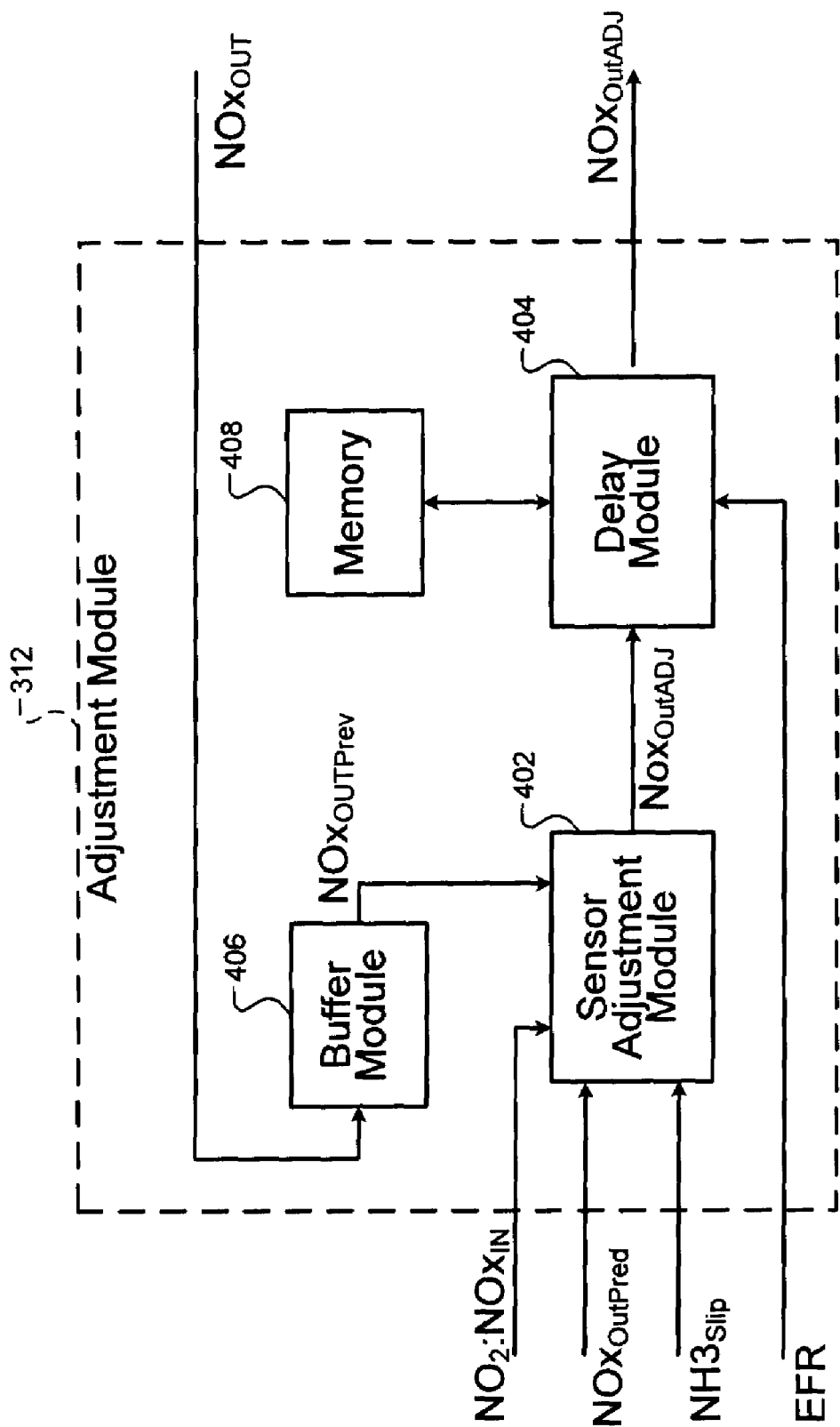
FIG. 4 is a functional block diagram of an exemplary adjustment module according to the principles of the present disclosure.

Referring now to FIG. 4, a functional block diagram of an exemplary implementation of the adjustment module 312 is presented. The adjustment module 312 includes a sensor adjustment module 402 and a delay module 404. The sensor adjustment module 402 receives the $NOx_{OutPred}$ and the $NH3_{Slip}$ from the SCR analysis module 304.

The sensor adjustment module 402 adjusts the $NOx_{OutPred}$ to account for the cross sensitivity of the NOx sensor 144 and outputs a $NOx_{ADJ}$ signal accordingly. In other words, the sensor adjustment module 402 adjusts the $NOx_{OutPred}$ to account for an estimate of $NH_3$ that the NOx sensor 144 will measure and output with the $NOx_{OUT}$.

Various parameters may attribute to the cross sensitivity of the NOx sensor 144. The sensor adjustment module 402 adjusts the $NOx_{OutPred}$ based on these parameters. For example, the sensor adjustment module 402 adjusts the $NOx_{OutPred}$ based on the $NH3_{Slip}$, a gain of the NOx sensor 144 that is attributable to $NO_2$ in the exhaust, and a gain of the NOx sensor 144 that is attributable to the cross sensitivity of the NOx sensor 144.

More specifically, the sensor adjustment module 402 determines the adjusted NOx (i.e., the $NOx_{ADJ}$) based on the $NOx_{OutPred}$, the $NH3_{Slip}$, and the gains of the NOx sensor 144. For example only, the sensor adjustment module 402 may determine the adjusted NOx using the equation:

$$NOx_{ADJ} = NOx_{OutPred} * g_{Ratio} + NH3_{Slip} * g_{NH3}, \quad (9)$$

where $g_{Ratio}$ is the gain of the NOx sensor 144 that is attributable to $NO_2$ and $g_{NH3}$ is the gain of the NOx sensor 144 that is attributable to the cross sensitivity of the NOx sensor 144.

The sensor adjustment module 402 may determine the $g_{Ratio}$ and the $g_{NH3}$ based on, for example, one or more lookup tables and/or calculations. The sensor adjustment module 402 determines the $g_{Ratio}$ based on the $NO_2$ ratio from the ratio determination module 302. For example only, the sensor adjustment module 402 determines the $g_{Ratio}$ from a lookup table of $g_{Ratio}$ indexed by $NO_2$ ratio. The sensor adjustment module 402 determines the $g_{NH3}$ based on the $NOx_{OutPred}$. For example only, the sensor adjustment module 402 may determine the $g_{NH3}$ from a lookup table of $g_{NH3}$ indexed by $NOx_{OutPred}$.

The sensor adjustment module 402 also adjusts the $NOx_{ADJ}$ based on the characteristics of the NOx sensor 144, such as the time constant of the NOx sensor 144. The time constant of the NOx sensor 144 corresponds to a period of time necessary for the NOx sensor 144 to change its output from a first $NOx_{OUT}$ to a second $NOx_{OUT}$.

The $NOx_{ADJ}$ adjusted for the characteristics of the NOx sensor 144 is referred to as the $NOx_{OutADJ}$. For example only, the sensor adjustment module 402 may apply a filter, and the $NOx_{OutADJ}$ may be determined using the equation:

$$NOx_{OutADJ}=(NOx_{ADJ}-NOx_{OUTPrev})(1-\exp(-t/\tau))-NOx_{OUTPrev} \quad (10)$$

where $\tau$ is a time constant of the NOx sensor 144, $NOx_{OUTPrev}$ is a previous $NOx_{OUT}$ sample provided before the $NOx_{OUT}$, and t is a period of time between the $NOx_{OUT}$ and the $NOx_{OUTPrev}$. The period of time between $NOx_{OUT}$ samples may be calibratable and may be set to, for example, 100.0 ms. In other words, the $NOx_{OUT}$ samples may be provided at a predetermined rate, such as once every 100.0 ms.

The $NOx_{OUTPrev}$ may be provided by a buffer module 406. For example, the buffer module 406 receives the $NOx_{OUT}$ samples, stores a first $NOx_{OUT}$ sample (i.e., the $NOx_{OUTPrev}$) until a second $NOx_{OUT}$ sample is received (i.e., the $NOx_{OUT}$), and outputs the first $NOx_{OUT}$ sample as the $NOx_{OUTPrev}$. In this manner, the buffer module 406 may include a one-sample buffer. The sensor adjustment module 402 may determine the $\tau$, for example, from a lookup table of $\tau$ based on the difference between the $NOx_{ADJ}$ and the $NOx_{OUTPrev}$.

The delay module 404 receives the $NOx_{OutADJ}$, stores the $NOx_{OutADJ}$, and outputs the $NOx_{OutADJ}$ when the period of time corresponding to the transport delay has passed. The delay module 404 may store the $NOx_{OutADJ}$, for example, in memory 408. The delay module 404 also determines the transport delay.

The delay module 404 determines an exhaust velocity based on various exhaust conditions, such as the EFR, the density of the exhaust, and the cross-sectional area of a portion of the exhaust system 213, such as an exhaust pipe. For example only, the delay module 404 determines the exhaust velocity using the equation:

$$v_{exh}=EFR/(\rho*A_{eff}) \quad (11)$$

where $\rho$ is the density of the exhaust and $A_{eff}$ is the cross-sectional area of the exhaust system 213. The density of the exhaust gas may be determined, for example, based on $T_A$.

The delay module 404 determines the transport delay based on the exhaust velocity and the distance between the NOx sensors 142 and 144. For example only, the delay module 404 determines the transport delay using the equation:

$$\text{transport delay}=L/v_{exh} \quad (12)$$

where L is the distance between the NOx sensors 142 and 144. The transport delay corresponds to the period of time necessary for the exhaust to travel to the NOx sensor 144. The delay module 404 outputs the $NOx_{OutADJ}$ when the period of time corresponding to the transport delay has passed. The $NOx_{OutADJ}$ is then used by the difference module 314 in determining the $NOx_{ERR}$.

Figure 5:
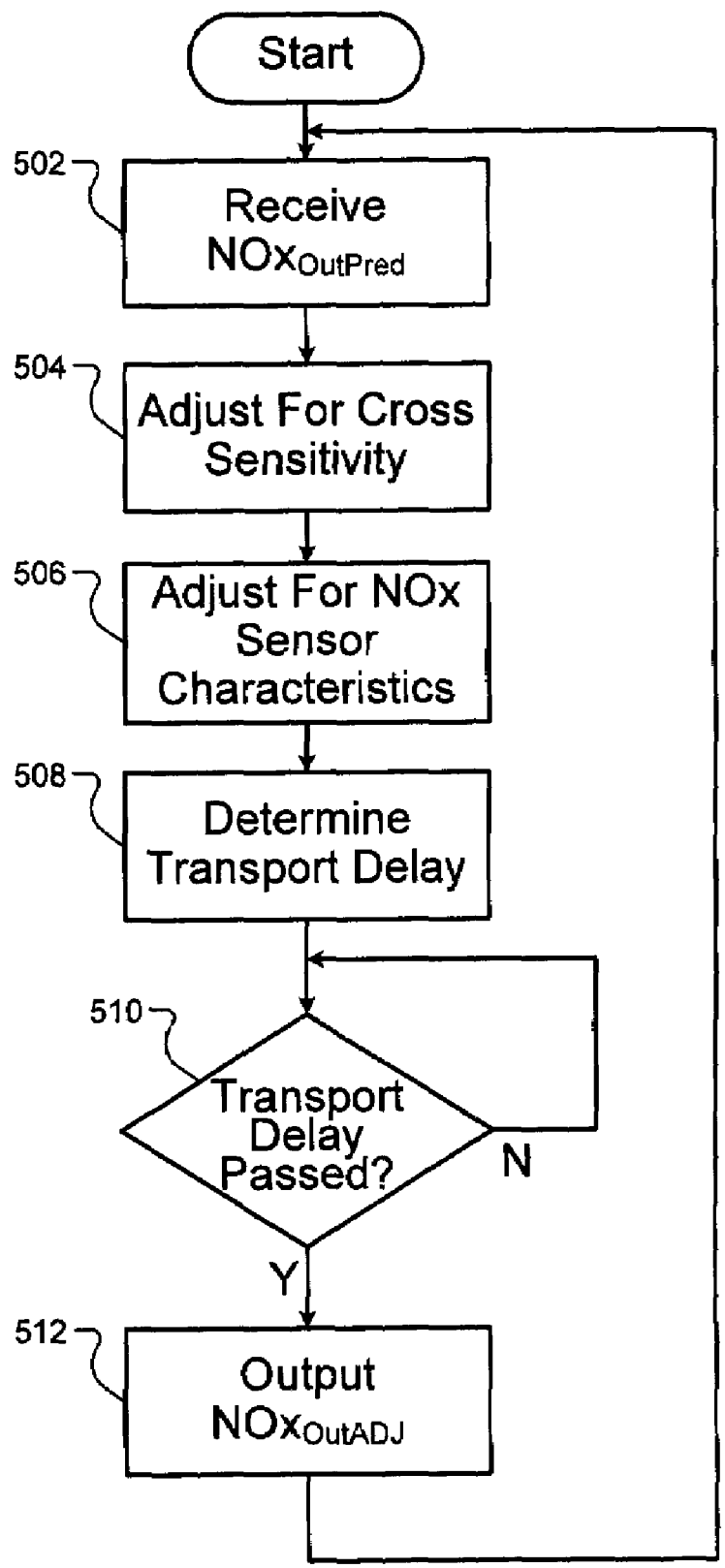
FIG. 5 is a flowchart depicting exemplary steps performed by the adjustment module according to the principles of the present disclosure.

Referring now to FIG. 5, a flowchart depicting exemplary steps performed by the adjustment module 312 is presented. Control begins in step 502 where control receives the $NOx_{OutPred}$. Control receives the $NOx_{OutPred}$ from the SCR analysis module 304.

In step 504 control adjusts the $NOx_{OutPred}$ based on the cross sensitivity of the NOx sensor 144 to $NH_3$. In other words, control determines the $NOx_{ADJ}$ based on the cross sensitivity of the NOx sensor 144. Control may determine the $NOx_{ADJ}$, for example, using equation (9) above.

In step 506, control adjusts the $NOx_{ADJ}$ based on the characteristics of the NOx sensor 144. For example only, control adjusts the $NOx_{ADJ}$ based on the time constant of the NOx sensor 144. Control may also determine the time constant based on the difference between the $NOx_{ADJ}$ and the $NOx_{OutPrev}$. Control may adjust based on the characteristics of the NOx sensor 144, for example, using equation (10) above. The $NOx_{OutPred}$ adjusted for the cross sensitivity of the NOx sensor 144 and the characteristics of the NOx sensor 144 is referred to as the $NOx_{OutADJ}$.

Control determines the transport delay in step 508. In other words, control determines how long to delay outputting the $NOx_{OutADJ}$ in step 508. Control determines the transport delay based on the exhaust velocity and the distance between the NOx sensors 142 and 144. For example only, control may determine the transport delay based on equation (12) above.

In step 510, control determines whether the transport delay has passed. In other words, control determines whether the period of time corresponding to the transport delay has passed since the $NOx_{OutPred}$ was received in step 510. If true, control proceeds to step 512; if false, control remains in step 510. Control outputs the $NOx_{OutADJ}$ in step 512, and control returns to step 502. In this manner, control delays the output of the $NOx_{OutADJ}$ and outputs the $NOx_{OutADJ}$ when the corresponding $NOx_{OUT}$ is output by the NOx sensor 144.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A dosing control system comprising:
    a selective catalytic reduction (SCR) analysis module that estimates ammonia (NH3) stored by an SCR catalyst, a maximum NH3 storage capacity of said SCR catalyst, and a nitrogen oxides (NOx) measurement for a first NOx sensor located downstream of said SCR catalyst;
    a dosing management module that controls dosing agent injection into an exhaust system upstream of said SCR catalyst based on said maximum NH3 storage capacity and said NH3 stored;
    an adjustment module that outputs an adjusted estimate of said NOx measurement based on said estimate of said NOx measurement, cross-sensitivity of said first NOx sensor, and a delay period for exhaust flow between a second NOx sensor located upstream of said SCR catalyst and said first NOx sensor; and
    an error module that selectively adjusts at least one of said NH3 stored and said maximum NH3 storage capacity based on a difference between said adjusted estimate and NOx measured by said first NOx sensor.

2. The dosing control system of claim 1 wherein said adjustment module outputs said adjusted estimate further based on a response period of said first NOx sensor.

3. The dosing control system of claim 1 wherein said cross sensitivity of said first NOx sensor includes a first sensitivity to nitrogen dioxide (NO2) and a second sensitivity to NH3.

4. The dosing control system of claim 3 wherein said SCR analysis module estimates NH3 slip downstream of said SCR catalyst, and
    wherein said adjustment module outputs said adjusted estimate based on a sum of a first product of said estimate of said NOx measurement and a NO2 gain corresponding to said first sensitivity and a second product of said NH3 slip and a NH3 gain corresponding to said second sensitivity.

5. The dosing control system of claim 4 wherein said adjustment module determines said NO2 gain based a ratio of NO2 to NOx.

6. The dosing control system of claim 4 wherein said adjustment module determines said NH3 gain based on said estimate of said NOx measurement.

7. The dosing control system of claim 4 wherein said SCR analysis module estimates NH3 desorption and adjusts said NH3 slip based on said NH3 desorption.

8. The dosing control system of claim 1 wherein said adjustment module outputs said adjusted estimate after said delay period.

9. The dosing control system of claim 1 wherein said adjustment module estimates said delay period based on a distance between said first and second NOx sensors and an exhaust velocity.

10. The dosing control system of claim 1 wherein said SCR analysis module estimates NH3 oxidation and estimates said NH3 stored based on said NH3 oxidation.

11. A dosing method comprising:
estimating ammonia (NH3) stored by an SCR catalyst, a maximum NH3 storage capacity of said SCR catalyst, and a nitrogen oxides (NOx) measurement for a first NOx sensor located downstream of said SCR catalyst;
controlling dosing agent injection into an exhaust system upstream of said SCR catalyst based on said maximum NH3 storage capacity and said NH3 stored;
outputting an adjusted estimate of said NOx measurement based on said estimate of said NOx measurement, cross-sensitivity of said first NOx sensor, and a delay period for exhaust flow between a second NOx sensor located upstream of said SCR catalyst and said first NOx sensor; and
selectively adjusting at least one of said NH3 stored and said maximum NH3 storage capacity based on a difference between said adjusted estimate and NOx measured by said first NOx sensor.

12. The dosing method of claim 11 wherein said outputting comprises outputting said adjusted estimate further based on a response period of said first NOx sensor.

13. The dosing method of claim 11 wherein said cross sensitivity of said first NOx sensor includes a first sensitivity to nitrogen dioxide (NO2) and a second sensitivity to NH3.

14. The dosing method of claim 13 further comprising estimating NH3 slip downstream of said SCR catalyst,
wherein said outputting comprises outputting said adjusted estimate based on a sum of a first product of said estimate of said NOx measurement and a NO2 gain corresponding to said first sensitivity and a second product of said NH3 slip and a NH3 gain corresponding to said second sensitivity.

15. The dosing method of claim 14 further comprising determining said NO2 gain based a ratio of NO2 to NOx.

16. The dosing method of claim 14 further comprising determining said NH3 gain based on said estimate of said NOx measurement.

17. The dosing method of claim 14 further comprising:
estimating NH3 desorption; and
adjusting said NH3 slip based on said NH3 desorption.

18. The dosing method of claim 11 further comprising:
determining said adjusted estimate; and
delaying for said delay period,
wherein said outputting comprises outputting said adjusted estimate after said delay period.

19. The dosing method of claim 11 further comprising estimating said delay period based on a distance between said first and second NOx sensors and an exhaust velocity.

20. The dosing method of claim 11 further comprising estimating NH3 oxidation, wherein said estimating said NH3 stored comprises estimating said NH3 stored based on said NH3 oxidation.

* * * * *